Figure 1:
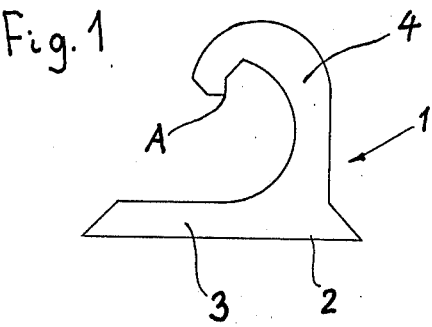

United States Patent [19]
Vinther

[11] 4,153,979
[45] May 15, 1979

[54] ASSEMBLING COMPONENTS

[76] Inventor: Knud Vinther, Mollegaardsparken 4, DK-8355 Ny Solbjerg, Denmark

[21] Appl. No.: 760,822

[22] Filed: Jan. 10, 1977

[30] Foreign Application Priority Data

Jan. 15, 1976 [DK] Denmark ............................... 148/76

[51] Int. Cl.² ........................................... A44B 21/00
[52] U.S. Cl. ............................... 24/201 HH; 52/594;
403/171; 403/219
[58] Field of Search ............... 24/201 HH, 230.5 PH, 24/230.5 RT, 230 BC; 312/257; 52/140, 222, 273, 291, 594; 160/235; 403/171, 219

[56] References Cited

U.S. PATENT DOCUMENTS

| | | | |
|---|---|---|---|
| 1,119,222 | 12/1914 | Baum | 24/201 HH |
| 3,667,186 | 6/1972 | Kato | 52/594 |
| 3,848,380 | 11/1974 | Assael | 52/291 |
| 3,925,856 | 12/1975 | Plummer | 24/201 C |

FOREIGN PATENT DOCUMENTS

| | | | |
|---|---|---|---|
| 134081 | 5/1950 | Fed. Rep. of Germany | 24/201 HH |
| 1683264 | 5/1970 | Fed. Rep. of Germany | 160/235 |
| 773505 | 4/1957 | United Kingdom | 160/235 |
| 931666 | 7/1963 | United Kingdom | 160/235 |

*Primary Examiner*—Kenneth Downey
*Attorney, Agent, or Firm*—Mason, Fenwick & Lawrence

[57] ABSTRACT

An assembling component for rigidly interlocking with one or more identical components, to lock plates and the like together including a base and a hook-shaped member integral with the base and having an outer side and an inner side with the hook-shaped member shaped such that a portion along the outer side is congruent with a portion of the inner side of a second identical assembling component when the base is bearing against the base of the identical assembling component and the hook-shaped members are interlocking.

9 Claims, 10 Drawing Figures

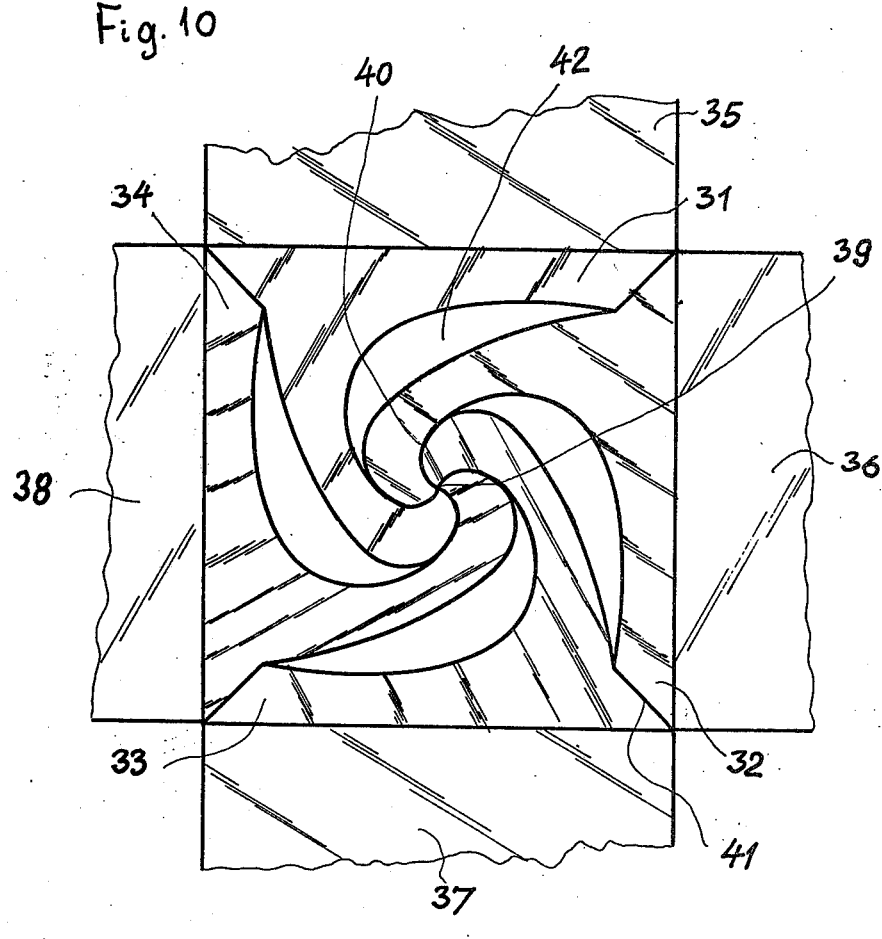

ASSEMBLING COMPONENTS

The invention relates to assembling components preferably assembling bars intended for the assembling of plate components adjoining along a nodal line in that each single component or bar at the underside can be fastened along the edge of each plate component by per se known devices for example screws, glue or parallel key connections, whereas the components or bars at their upperside are designed to have identical cross sections constituting locking components made to engage each other along the nodal line.

From German registered notification No. 1940782 are known assembling components of the said character being characteristic in that the outline of the components or the cross section of the bars at the side facing the nodal line consists of straight lines at right angles to each other. The cross section of each single bar may be described as hook-shaped, and the outline of the outer side of hook-shaped part is partly congruent with the outline of the inner side in such a manner that the inner outline is slightly shorter than the outer outline, along the length of the outline up to the point, where it meets the plate-shaped component.

This known construction suffers several drawbacks. The rectilinear outlines requires the components to be telescoped when assembled. Moreover the section modulus will be noticeably lower in case of bending one way than in case of bending the other, meaning that the hook-shaped profile will easily tilt backward, as the hook-shaped peofile at the base will be left solely to absorb the force. In order that assembling components according to the described known construction may function, they must be made with extremely small tolerances.

The assembling components according to the invention are characteristic in that the cross section of each assembling component consists of a base part and a hook-shaped part integral with the base part, and in that the outline of the cross section of the assembling component along the outer side of the hook-shaped part is congruent with the outline of the cross section of the assembling component along the inner side of the hook-shaped part at least as regards a section of the end leading to the nodal line, and further in that the base parts bear against each other. It is hereby achieved that the hook-shaped parts may pivot relative to each other, until the last component is inserted. The first components may easily be brought to engage each other, as it is unnecessary to push the components into each other, but simply to let the hook-shaped parts engage each other by pivotal movement relative to the longitudinal direction. Working thus with four components to be coupled together at right angles it has proven possible to assemble the two in this manner, while third may easily be inserted, because the three parts may all turn in relation to each other within large tolerances. When the one end of the outer outline leading to the appertaining plate component forms an angle to the normal of the plate component it will be possible to produce a supporting effect, which will enhance to a considerable extent one section modulus i.e. the lowest, against bending. When the base parts rest against each other in the described manner there will moreover be effected an advantageous transfer of force as the hook-shaped part accordingly will not absorb all the force, as was the case in the known construction. The components may moreover be characteristic in that the outlines of the faces of the base parts bearing against each other are congruent. In this respect is achieved an advantageous transfer of force between the base parts, whereby the hook-shaped parts are less stressed.

According to the invention the two outlines can be congruent over their full length, which provides a very rigid construction.

The components may furthermore be may have the outline of the tip of each hook-shaped part as some curve-shaped sections. This will permit the components to be easily assembled with each other, until the last component has been inserted for locking the position of the components.

In case the components consist of four units for the assembling of four plate-shaped components at angles of 90° within an assembling area or assembling cross section in the form of a square, the two outlines or parting-faces of the components leading to the perimeter of the square extend diagonally mainly, along a straight or slightly curved line. This construction represents a very advantageous embodiment, as the faces diagonally faces will absorb a great deal of the force or moments, which the hook-shaped portions would otherwise have to absorb. And to this may be added another important effect allowing the construction of the assembling components with large tolerances i.e. variations within some tenths of a milimeter. The diagonally extending faces will bring about a certain wedging action of the individual component, if it is shifted towards the nodal line. If for instance a rack is built of plate-shaped vertical and horizontal components by means of assembling components according to the present embodiment, the play of each single joint caused by large tolerances will disappear as a result of the wedging action that will arise on account of the weight of the components. It will consequently be easier to work with the mentioned greater tolerances, which allow an easier assembling of the components, and it will, in particular, be easy to insert the last or fourth component. Each single component is integral with the plate component which will reduce the costs of mass production.

For the application in case of corner joints it may be natural to use in a known manner a component or a bar, which is not connected with any plate component, and the profile of which is making up several bar profiles.

The invention is explained in detail with reference to the drawing in which:

FIGS. 1–6 show several embodiments of a component or a bar according to the invention, the hook-shaped section of which consists of curved or straight lines, and different means of fastening.

Figure 7:
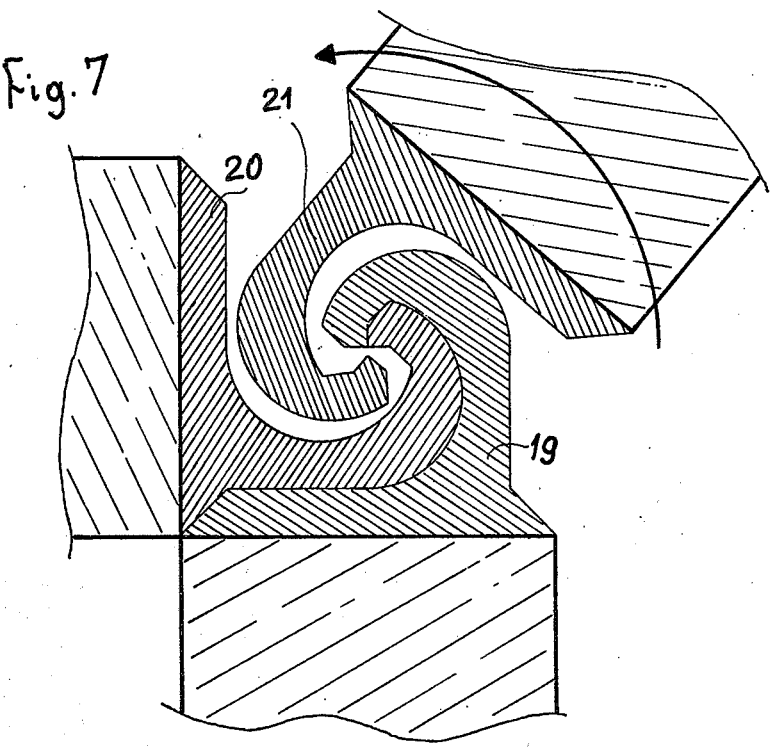
Figure 8:
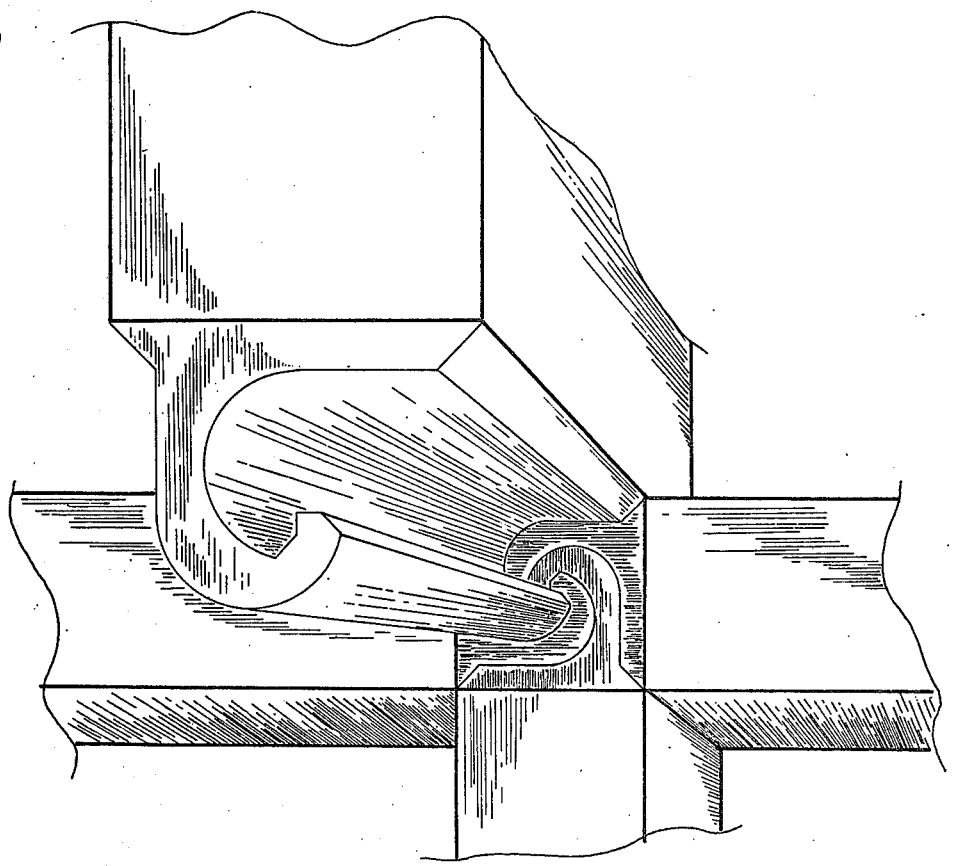
Figure 9:
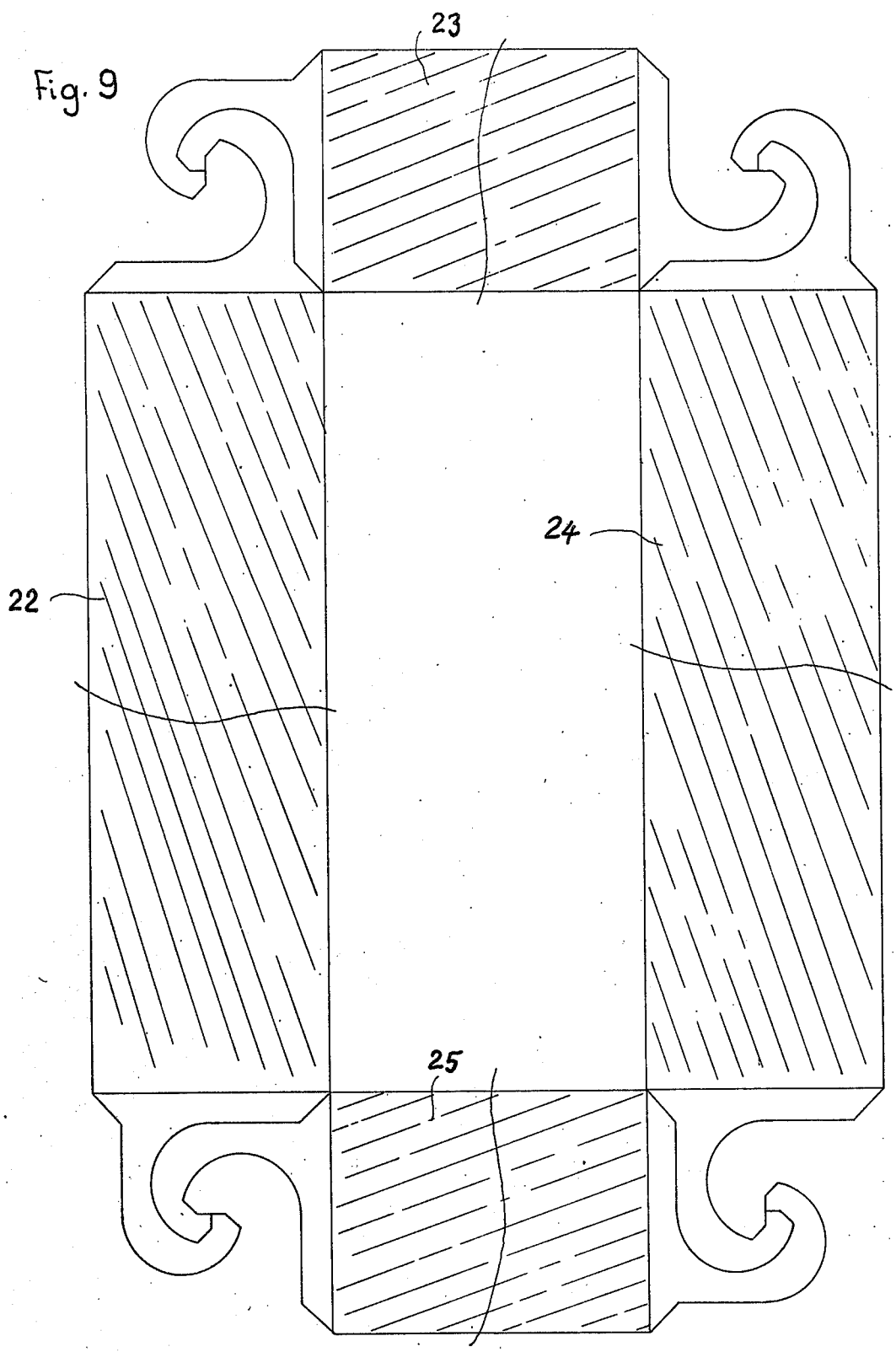

FIG. 7 shows an end elevational view of three assembling components according to an embodiment in which the two components have been brought in contact with each other, and with a third component in the process of being engaged with the two former, by being swung into position, FIG. 8 shows a perspective view of the embodiment shown in FIG. 7 with an assembling of components in which the last assembling component is partly inserted for the locking of the construction, FIG. 9 shows a view from one end with four plates locked together by locking bars, and FIG. 10 shows another embodiment of a set of assembling components according to the invention, hereby with parts of hereby connected plate components.

FIG. 1 shows one end of an assembling bar 1 which is intended for glueing to the edge of a plate along the underside 2. It may also be intended for application without a plate, if a junction of three plates adjoining is desired, in which case the fourth assembling bar will exclusively serve locking bar.

The outline or cross section of the assembling bar consists of a base part 3 and a hook-shaped part 4. A certain point A situated at the tip of the hook-shaped part 4 designates a point or a line from which two congruent curved outlines along respectively the inner side of the hook-shaped part 4 and the base part 3, and along the outer side of the hook-shaped part 4 and the base part 3 are passing.

The outline consists of a straight, broken line beginning at the point A to continue as a curved section and then again as a straight line having a bend. The outline is identical as regards the inner and the outer side of the assembling bar, and the two outlines have been turned 90° relative to each other around the point A, as the assembling bar is intended to act together with three other identical bars.

Figure 2:
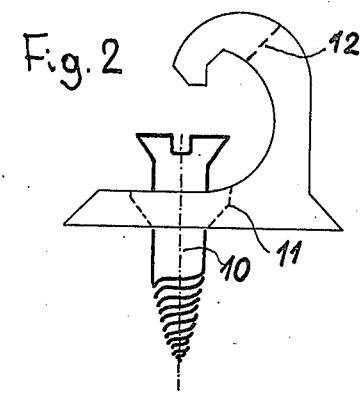
Figure 3:
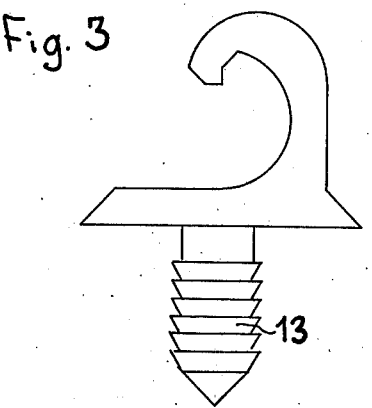

FIG. 2 shows an embodiment which is screwed on by the screw 10. At intervals, the bar is provided with holes 11 and notches for the screw. FIG. 3 shows a bar having, at intervals, tenons 13.

Figure 4:
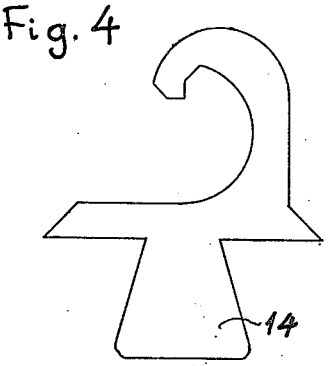
Figure 5:
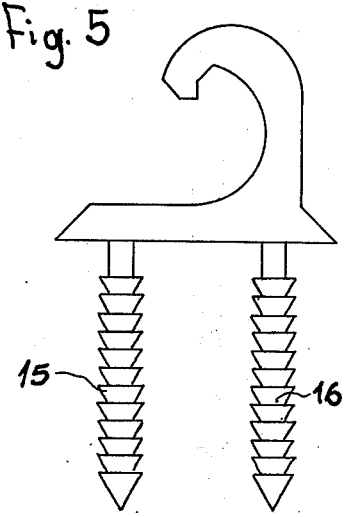
Figure 6:
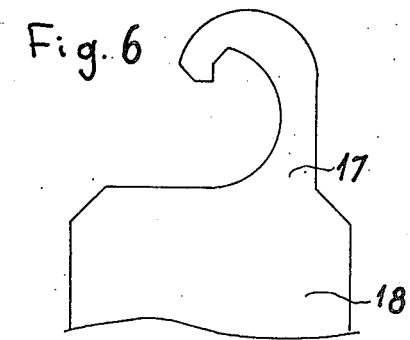

FIG. 4 shows a bar provided over the entire length with a locking member shaped as a dovetail. FIG. 5 shows an embodiment having tenons 15,16. FIG. 6 shows a bar 17 being in one with an appertaining plate 18.

FIG. 7 shows a joint in which two assembling components 19,20 with attach plates have been assembled by swinging around the longitudinal axis of the components, as shown by the arrow and shows the manner a third assembling component 21 with attach plate may be swung in to take a position in which the attached plates are positioned perpendicular or parallel to each other. When the fourth assembling bar is to be inserted as warranted by the construction according to FIG. 7, it must take place as shown in FIG. 8 viz. by insertion in the longitudinal direction.

FIG. 9 shows four plates 22,23,24 and 25 viewed from one end, and being assembled by way of assembling components according to the last embodiment. It should be noticed that in case of the assembling of a rectangular cross section as shown, it is sufficient to have two assembling components at each junction to obtain a stable connection.

FIG. 10 shows four assembling bars 31,32,33 and 34 fastened to four plate components 35,36,37 and 38 of which only the ends are shown. The assembling bars have a profile of which only the the outline 40 nearest to the nodal line, and the outline 41 farthest away from from the nodal line are congruent. The intermediary sections of the outlines are accordingly not congruent, but they are designed so as to leave a free space between the assembling bars in these places, cf. for instance reference number 42. This embodiment facilitates an assembling of the components, and requires less material. It is furthermore possible in working with four components to achieve an easier assembling, as even the third component may join the others by insertion crosswise of the longitudinal direction. It is now only necessary to insert the fourth component in the longitudinal direction. The contact face 41, where the base parts bear against each other may preferably be a plane face as shown, but there is nothing in principle to prevent that there may be a contact of lines in this place between the base parts. The contact face 41 may even be curving.

I claim:

1. An assembling component for rigidly interlocking with two or more identical components, to lock plates and the like together, comprising a base and a hook-shaped member integral with the base and having an outer side and an inner side, said hook-shaped member shaped such that at least a portion along the outer side of the hook-shaped member is congruent with at least a portion of the inner side of the hook-shaped member of a second identical assembling component when said base bears against the base of one of the identical assembling component and said hook-shaped members are interlocking and shaped such that at least two of the identical components may be interlocked about a nodal line by pivotal movement of each component about the nodal line and such that the last remaining identical component would require insertion in the direction along the nodal line with the base of the last remaining identical component bearing against the bases of the adjacent identical component to form a rigid structure.

2. The assembling component according to claim 1 wherein the surfaces of the bases which bear against one another are congruent.

3. The assembling component according to claim 1 wherein the entire outer surface of the hook-shaped member is congruent with the entire inner surface of the second assembling component.

4. The assembling component according to claim 1 wherein the tip of the hook-shaped member includes curve-shaped sections.

5. The assembling component of claim 3 wherein the tip of the hook-shaped member includes curve-shaped sections.

6. The assembling component of claim 2 wherein said bases and said hook-shaped members are shaped such that when four components are interlocked the four bases form a square and a portion of the surfaces of contact between the bases are generally positioned along the diagonals of said square.

7. The assembling component of claim 2 wherein the entire outer surface of the hook-shaped member is congruent with the entire inner surface of the second assembling component.

8. The assembling component of claim 6 wherein the entire outer surface of the hook-shaped member is congruent with the entire inner surface of the second assembling component.

9. The assembling component of claim 1 wherein said outer surface of the hook-shaped member includes a curved section, a first straight section adjacent the curved section and extending from a curved section toward the base and a second straight section positioned at an angle to the first straight section and extending from the first straight section toward the base.

* * * * *